US012232511B2

United States Patent
Leary et al.

(10) Patent No.: US 12,232,511 B2
(45) Date of Patent: Feb. 25, 2025

(54) FROZEN FOOD CATCHING DEVICE

(71) Applicants: Kristen Leary, Syracuse, NY (US); Sean Leary, Syracuse, NY (US)

(72) Inventors: Kristen Leary, Syracuse, NY (US); Sean Leary, Syracuse, NY (US)

( * ) Notice: Subject to any disclaimer, the term of this patent is extended or adjusted under 35 U.S.C. 154(b) by 29 days.

(21) Appl. No.: 18/135,173

(22) Filed: Apr. 16, 2023

(65) Prior Publication Data
US 2024/0341324 A1    Oct. 17, 2024

(51) Int. Cl.
| | |
|---|---|
| *B65D 25/02* | (2006.01) |
| *A23G 9/50* | (2006.01) |
| *A47G 19/30* | (2006.01) |
| *B65D 25/28* | (2006.01) |
| *B65D 81/38* | (2006.01) |
| *B65D 85/78* | (2006.01) |

(52) U.S. Cl.
CPC .............. *A23G 9/503* (2013.01); *A47G 19/30* (2013.01); *B65D 25/02* (2013.01); *B65D 25/2802* (2013.01); *B65D 81/3813* (2013.01); *B65D 85/78* (2013.01)

(58) Field of Classification Search
CPC .......... A23G 9/503; A23G 9/50; A23G 9/506; A23G 9/26; A47G 19/30; B65D 25/02; B65D 81/38; B65D 81/3813; B65D 81/3816; B65D 81/3823
See application file for complete search history.

(56) References Cited

U.S. PATENT DOCUMENTS

| | | | | |
|---|---|---|---|---|
| 2,632,708 | A * | 3/1953 | Sueskind ............... | A23G 9/503 426/134 |
| 2,803,550 | A * | 8/1957 | Ackalusky ............... | A23G 9/26 D1/102 |
| 3,459,296 | A * | 8/1969 | Berg ........................ | A23G 9/00 D7/672 |
| 2012/0058218 | A1 * | 3/2012 | Blondeau ............... | A23G 9/503 426/135 |

* cited by examiner

*Primary Examiner* — Javier A Pagan
(74) *Attorney, Agent, or Firm* — The Iwashko Law Firm, PLLC; Lev Ivan Gabriel Iwashko

(57) ABSTRACT

A frozen food catching device removably connected to at least a portion of a handle of a frozen food, the frozen food catching device including a food catching base to receive the frozen food that has melted, a plurality of walls disposed on at least a portion of a perimeter of the food catching base to prevent the frozen food from moving away from the food catching base, and a handle receiving aperture disposed at a center of the food catching base to receive the handle therethrough.

4 Claims, 4 Drawing Sheets

FROZEN FOOD CATCHING DEVICE

BACKGROUND

1. Field

The present general inventive concept relates generally to kitchenware, and particularly, to a frozen food catching device.

2. Description of the Related Art

Frozen food are popular types of food particularly in hot and/or warm temperatures. There are a large variety of frozen foods, which include ice cream, frozen custard, sorbet, gelato, frozen yogurt, Italian ice, and/or snow cones. Frozen food is often served in a bowl, a cup, a cone, and/or on a stick.

However, eating frozen food on a stick and/or on a cone can be a messy ordeal. Despite the enjoyment of eating the frozen food, typically, the frozen food will start to melt, which can cover hands and/or clothing of a consumer of the frozen food. Young children in particular are susceptible to having sticky hands from the melting of the frozen food.

Therefore, there is a need for a frozen food catching device to prevent leakage from the frozen food on a stick and/or a cone while being consumed.

SUMMARY

The present general inventive concept provides a frozen food catching device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a frozen food catching device removably connected to at least a portion of a handle of a frozen food, the frozen food catching device including a food catching base to receive the frozen food that has melted, a plurality of walls disposed on at least a portion of a perimeter of the food catching base to prevent the frozen food from moving away from the food catching base, and a handle receiving aperture disposed at a center of the food catching base to receive the handle therethrough.

The food catching base may include a plurality of ridges disposed in parallel on an inner surface thereof to prevent at least one liquid from moving freely thereon, and a plurality of channels disposed between each of the plurality of ridges to collect the at least one liquid therein.

The plurality of walls may include a first wall angularly disposed away from a first edge on a top side of the food catching base with respect to a first direction, a second wall angularly disposed away from a second edge on the top side of the food catching base with respect to a second direction different from the first direction, a third wall angularly disposed away from a third edge on the top side of the food catching base with respect to a third direction different from at least one of the first direction and the second direction, and a fourth wall angularly disposed away from a fourth edge on the top side of the food catching base with respect to a fourth direction different from at least one of the first direction, the second direction, and the third direction.

The third wall may include a catching surface having a width greater than at least one of a width of the first wall, a width of the second wall, and a width of the fourth wall, such that the catching surface receives dripping from the frozen food thereon.

The frozen food catching device may further include an insulation layer disposed on at least a portion of the food catching base and each of the plurality of walls to prevent a decrease in a temperature level on an outer surface of the food catching base and each of the plurality of walls in response to a decrease in a temperature level of an inner surface of the food catching base and each of the plurality of walls.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Frozen Food Catching Device 100
Food Catching Base 110
Walls 120
First Wall 121
Second Wall 122
Third Wall 123
Catching Surface 123a
Fourth Wall 124
Handle Receiving Aperture 130
Insulation Layer 140

Figure 1A:
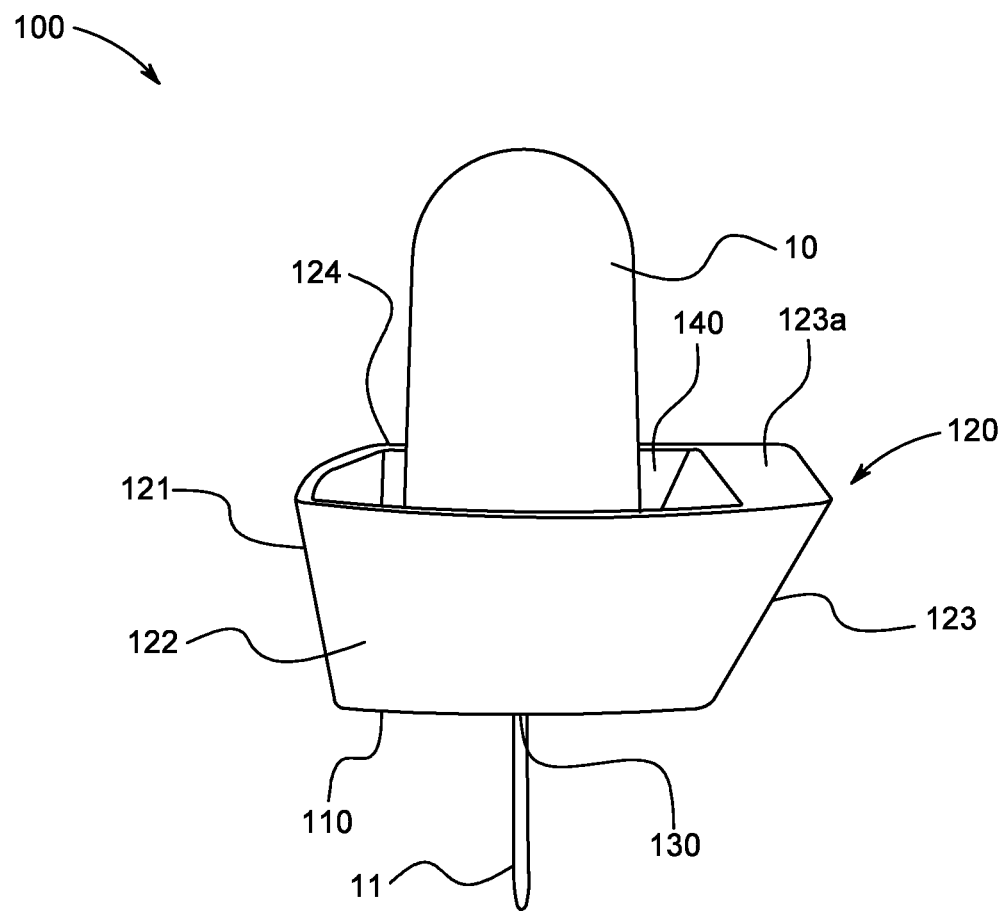
FIG. 1A illustrates a top side perspective view of a frozen food catching device, according to an exemplary embodiment of the present general inventive concept.

FIG. 1A illustrates a top side perspective view of a frozen food catching device 100, according to an exemplary embodiment of the present general inventive concept.

Figure 1B:
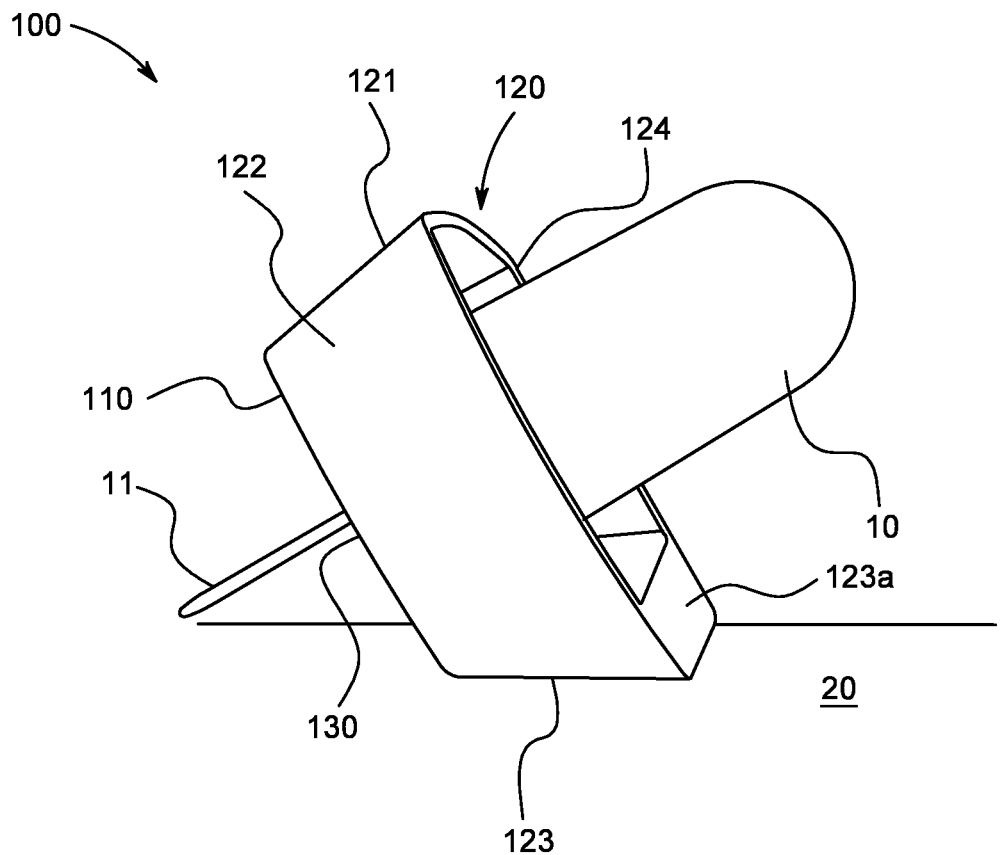
FIG. 1B illustrates a top side perspective view of the frozen food catching device as disposed on an external surface, according to an exemplary embodiment of the present general inventive concept.

FIG. 1B illustrates a top side perspective view of the frozen food catching device 100 as disposed on an external surface 20, according to an exemplary embodiment of the present general inventive concept.

Figure 2:
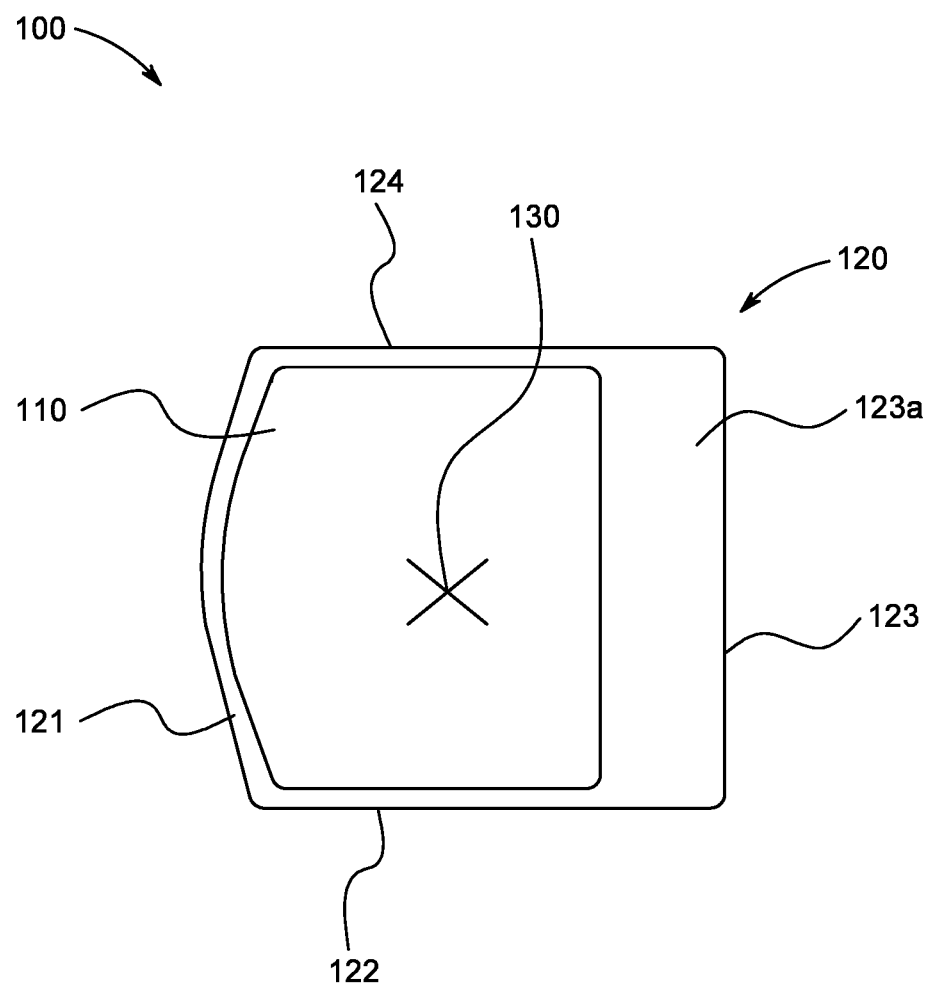
FIG. 2 illustrates an elevational top view of the frozen food catching device, according to an exemplary embodiment of the present general inventive concept.

FIG. 2 illustrates an elevational top view of the frozen food catching device 100, according to an exemplary embodiment of the present general inventive concept.

The frozen food catching device 100 may be constructed from at least one of silicone, rubber, etc., but is not limited thereto. The frozen food catching device 100 may use silicone and/or rubber to ensure a user biting thereon will not be injured from a more rigid and/or hard material.

The frozen food catching device 100 may include a food catching base 110, a plurality of walls 120, a handle receiving aperture 130, and an insulation layer 140, but is not limited thereto.

Figure 3:
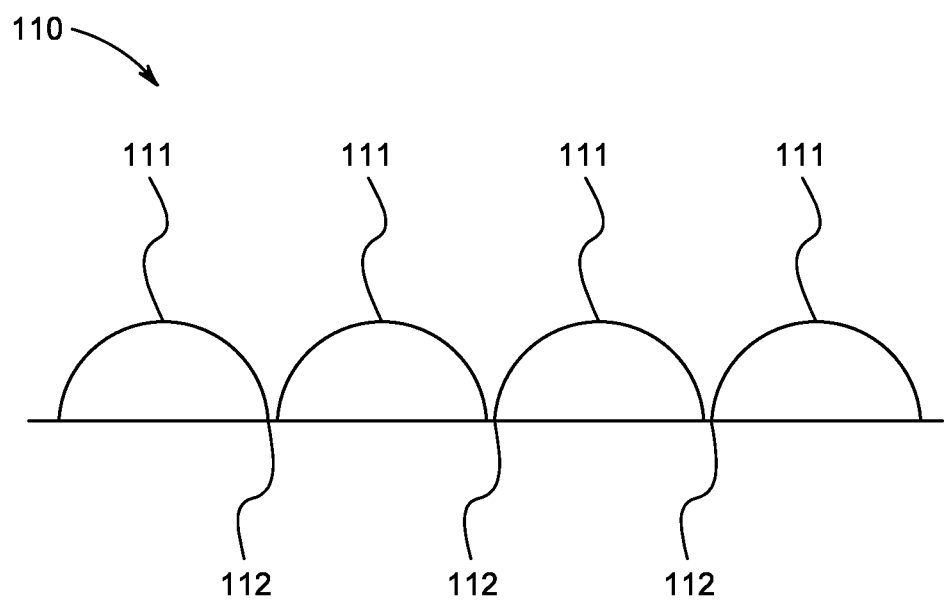
FIG. 3 illustrates a zoomed in view of a food catching base, according to an exemplary embodiment of the present general inventive concept.

FIG. 3 illustrates a zoomed in view of a food catching base 110, according to an exemplary embodiment of the present general inventive concept.

The food catching base 110 may be a planar surface. Referring to FIG. 3, the food catching base 110 may include a plurality of ridges 111 disposed in parallel on an inner surface thereof to prevent at least one liquid (e.g., melted ice cream, melted frozen yogurt, water, etc.) from moving freely (i.e., any direction) thereon. In other words, the plurality of ridges 111 may also form a plurality of channels 112 therebetween to allow the at least one liquid to collect within the plurality of channels 112 between the plurality of ridges 111.

Referring to FIGS. 1A through 2, the plurality of walls 120 are illustrated to have a rectangular shape, such that the plurality of walls 120 have four sides. However, the plurality of walls 120 may be circular, cylindrical, triangular, pentagonal, hexagonal, heptagonal, octagonal, or any other shape known to one of ordinary skill in the art, but is not limited thereto.

The plurality of walls 120 may include a first wall 121, a second wall 122, a third wall 123, and a fourth wall 124, but is not limited thereto.

The first wall 121 may be angularly (e.g., perpendicularly) disposed away from a first edge on a top side of the food catching base 110 with respect to a first direction. Referring to FIG. 2, the first wall 121 may be curved and/or convex away from the food catching base 110. The second wall 122 may be angularly (e.g., perpendicularly) disposed away from a second edge on the top side of the food catching base 110 with respect to a second direction different from the first direction. The third wall 123 may be angularly (e.g., perpendicularly) disposed away from a third edge on the top side of the food catching base 110 with respect to a third direction different from the first direction and/or the second direction. Lastly, the fourth wall 124 may be angularly (e.g., perpendicularly) disposed away from a fourth edge on the top side of the food catching base 110 with respect to a fourth direction different from the first direction, the second direction, and/or the third direction.

Accordingly, the first wall 121, the second wall 122, the third wall 123, and/or the fourth wall 124 may extend away from the food catching base 110 in different directions with respect to each other. Collectively, the first wall 121, the second wall 122, the third wall 123, and/or the fourth wall 124 may prevent the at least one liquid from moving away from (i.e., moving off) the food catching base 110. As such, the food catching base 110, the first wall 121, the second wall 122, the third wall 123, and/or the fourth wall 124 may prevent the at least one liquid from dripping and/or leaking onto hands and/or clothing of a user.

The plurality of walls 120 may be disposed around at least a portion of a perimeter of the food catching base 110. The food catching base 110, the first wall 121, the second wall 122, the third wall 123, and/or the fourth wall 124 may receive a frozen food 10 therein and/or therebetween.

The third wall 123 may include a catching surface 123a, but is not limited thereto.

The catching surface 123a may have dimensions (i.e., a width) greater than a width of a remainder of the plurality of walls 120. More specifically, the catching surface 123a may have a width greater than a width of the first wall 121, a width of the second wall 122, and/or a width of the fourth wall 124. Thus, the catching surface 123a may increase a surface area thereon to receive dripping and/or leaking of the frozen food 10. As such, the catching surface 123a may prevent dripping and/or leakage of the frozen food 10 onto an external surface 20 (e.g., a table, a countertop, a desk, a ground surface, etc.).

Furthermore, the third wall 123 may be disposed on the external surface 20, such that the third wall 123 may elevate the food catching base 110 and/or the first wall 121, the second wall 122, and/or the fourth wall 124 at an incline with respect to the external surface 20 while the third wall 123 is disposed on the external surface 20. Referring again to FIG. 2, the width is greater on the third wall 123 which increases the elevation compared to the width of the first wall 121, the width of the second wall 122, and/or the width of the fourth wall 124.

The handle receiving aperture 130 may be disposed at a center of the food catching base 110. The handle receiving aperture 130 may receive a handle 11 and/or a cone therethrough. Referring to FIG. 2, the handle receiving aperture 130 is illustrated to have a size and/or a shape corresponding to the handle 11 (e.g., a stick). However, the size and/or the shape of the handle receiving aperture 130 may be circular, triangular, pentagonal, hexagonal, heptagonal, octagonal, or any other shape known to one of ordinary skill in the art, but is not limited thereto. In other words, the handle receiving aperture 130 may be constructed to fit different types of the handle 11, such as an ice cream cone.

The insulation layer 140 may include a polyurethane foam, a rubber foam, and a cold foam sealant chemical, but is not limited thereto.

The insulation layer 140 may be disposed on at least a portion of the food catching base 110, the first wall 121, the second wall 122, the third wall 123, and/or the fourth wall 124. For example, the insulation layer 140 as the cold foam sealant chemical may be applied via a spray directly on a surface of the food catching base 110, the first wall 121, the second wall 122, the third wall 123, and/or the fourth wall 124. Thus, the insulation layer 140 may prevent a decrease in a temperature level from an inner surface of the food catching base 110, the first wall 121, the second wall 122, the third wall 123, and/or the fourth wall 124 to an outer surface of the food catching base 110, the first wall 121, the second wall 122, the third wall 123, and/or the fourth wall 124. In other words, the insulation layer 140 may prevent a decrease in the temperature level on the outer surface of the food catching base 110, the first wall 121, the second wall 122, the third wall 123, and/or the fourth wall 124 in response to a decrease in the temperature level of the inner surface of the food catching base 110, the first wall 121, the second wall 122, the third wall 123, and/or the fourth wall 124. As such, a temperature level (e.g., cold temperature) of the frozen food 10 from dissipating to the outer surface of the food catching base 110, the first wall 121, the second wall 122, the third wall 123, and/or the fourth wall 124.

Therefore, the frozen food catching device 100 may prevent leakage on the handle 11 due to melting of the frozen food 10 while being consumed. Also, the frozen food catching device 100 may ensure hands and/or clothing of the user remain clean from the frozen food 10 that has melted.

The present general inventive concept may include a frozen food catching device 100 removably connected to at least a portion of a handle 11 of a frozen food 10, the frozen food catching device 100 including a food catching base 110 to receive the frozen food 10 that has melted, a plurality of walls 120 disposed on at least a portion of a perimeter of the food catching base 110 to prevent the frozen food 10 from moving away from the food catching base 110, and a handle receiving aperture 130 disposed at a center of the food catching base 110 to receive the handle 11 therethrough.

The food catching base 110 may include a plurality of ridges 111 disposed in parallel on an inner surface thereof to prevent at least one liquid from moving freely thereon, and a plurality of channels 112 disposed between each of the plurality of ridges 111 to collect the at least one liquid therein.

The plurality of walls 120 may include a first wall 121 angularly disposed away from a first edge on a top side of the food catching base 110 with respect to a first direction, a second wall 122 angularly disposed away from a second edge on the top side of the food catching base 110 with respect to a second direction different from the first direction, a third wall 123 angularly disposed away from a third edge on the top side of the food catching base 110 with respect to a third direction different from at least one of the first direction and the second direction, and a fourth wall 124 angularly disposed away from a fourth edge on the top side of the food catching base 110 with respect to a fourth direction different from at least one of the first direction, the second direction, and the third direction.

The third wall 123 may include a catching surface 123a having a width greater than at least one of a width of the first wall 121, a width of the second wall 122, and a width of the fourth wall 124, such that the catching surface 123a receives dripping from the frozen food 10 thereon.

The frozen food catching device 110 may further include an insulation layer 140 disposed on at least a portion of the food catching base 110 and each of the plurality of walls 120 to prevent a decrease in a temperature level on an outer surface of the food catching base 110 and each of the plurality of walls 120 in response to a decrease in a temperature level of an inner surface of the food catching base 110 and each of the plurality of walls 120.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A frozen food catching device removably connected to at least a portion of a handle of a frozen food, the frozen food catching device comprising:
   a food catching base to receive the frozen food that has melted;
   a plurality of walls disposed on at least a portion of a perimeter of the food catching base to prevent the frozen food from moving away from the food catching base,
      a first wall angularly disposed away from a first edge on a top side of the food catching base with respect to a first direction, such that the first wall and the first edge on the top side of the food catching base form a first angle,
      a second wall angularly disposed away from a second edge on the top side of the food catching base with respect to a second direction different from the first direction, such that the second wall and the second edge on the top side of the food catching base form a second angle different from the first angle,
      a third wall angularly disposed away from a third edge on the top side of the food catching base with respect to a third direction different from at least one of the first direction and the second direction, such that the third wall and the third edge on the top side of the food catching base form a third angle different from the first angle and the second angle such that the third angle is at least twice as large as the first angle, and
      a fourth wall angularly disposed away from a fourth edge on the top side of the food catching base with respect to a fourth direction different from at least one of the first direction, the second direction, and the third direction; and
   a handle receiving aperture disposed at a center of the food catching base to receive the handle therethrough.

2. The frozen food catching device of claim 1, wherein the food catching base comprises:
   a plurality of ridges disposed in parallel on an inner surface thereof to prevent at least one liquid from moving freely thereon; and a plurality of channels disposed between each of the plurality of ridges to collect the at least one liquid therein.

3. The frozen food catching device of claim 1, wherein the third wall comprises:
a catching surface having a width greater than at least one of a width of the first wall, a width of the second wall, and a width of the fourth wall, such that the catching surface receives dripping from the frozen food thereon.

4. The frozen food catching device of claim 1, further comprising:
an insulation layer disposed on at least a portion of the food catching base and each of the plurality of walls to prevent a decrease in a temperature level on an outer surface of the food catching base and each of the plurality of walls in response to a decrease in a temperature level of an inner surface of the food catching base and each of the plurality of walls.

\* \* \* \* \*